March 1, 1966     K. E. GREEN     3,237,389
FRUIT PICKING APPARATUS
Filed Nov. 13, 1962     7 Sheets-Sheet 6
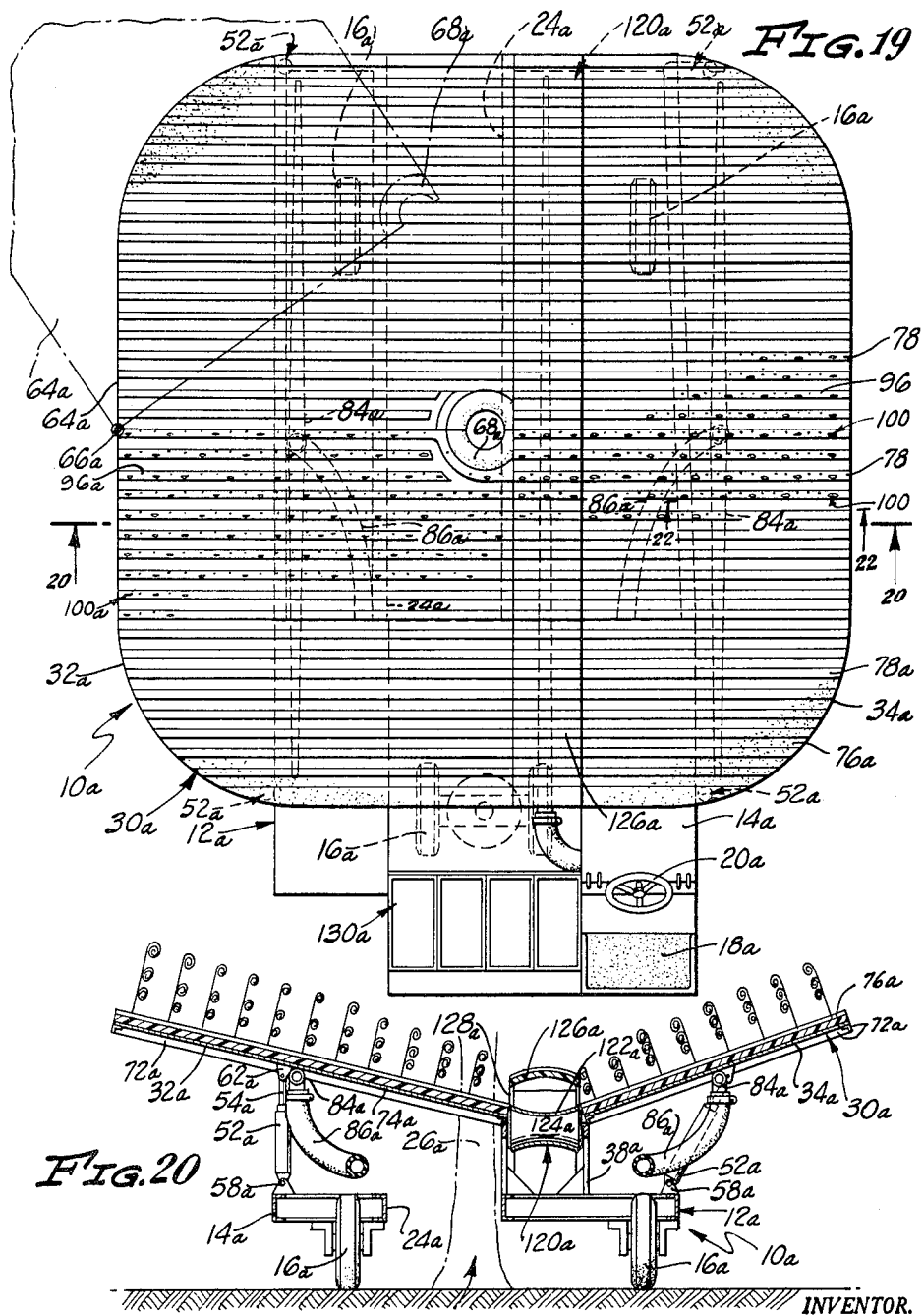
INVENTOR.
KENNETH E. GREEN
BY
ATTORNEYS

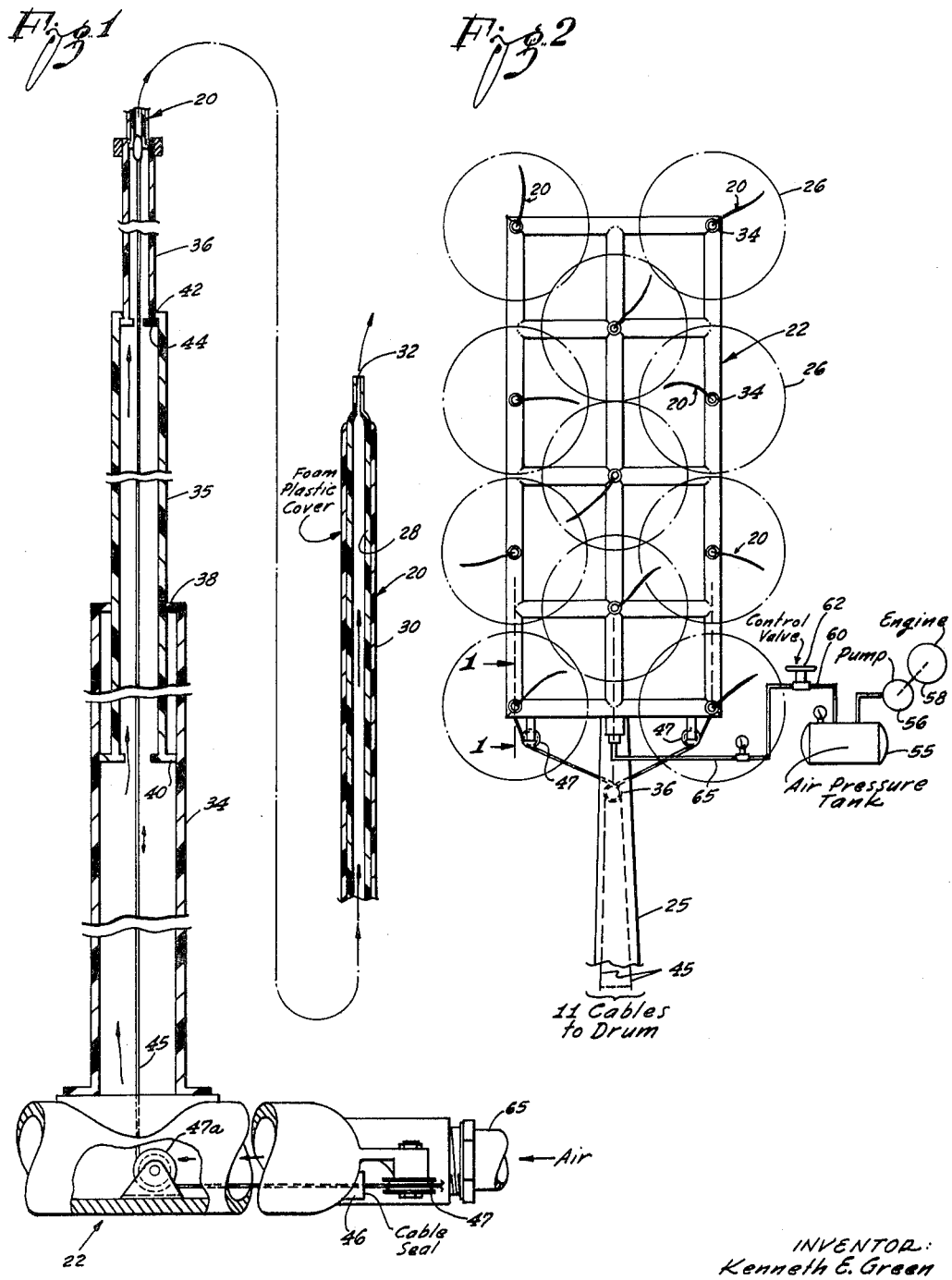

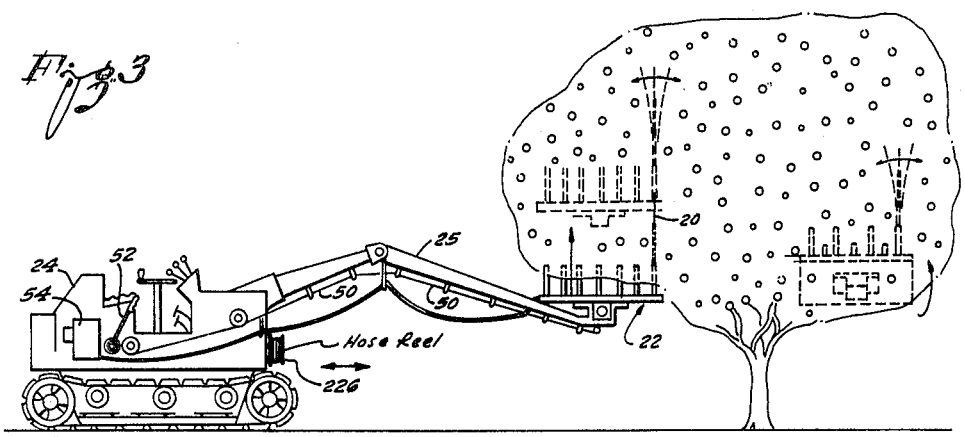
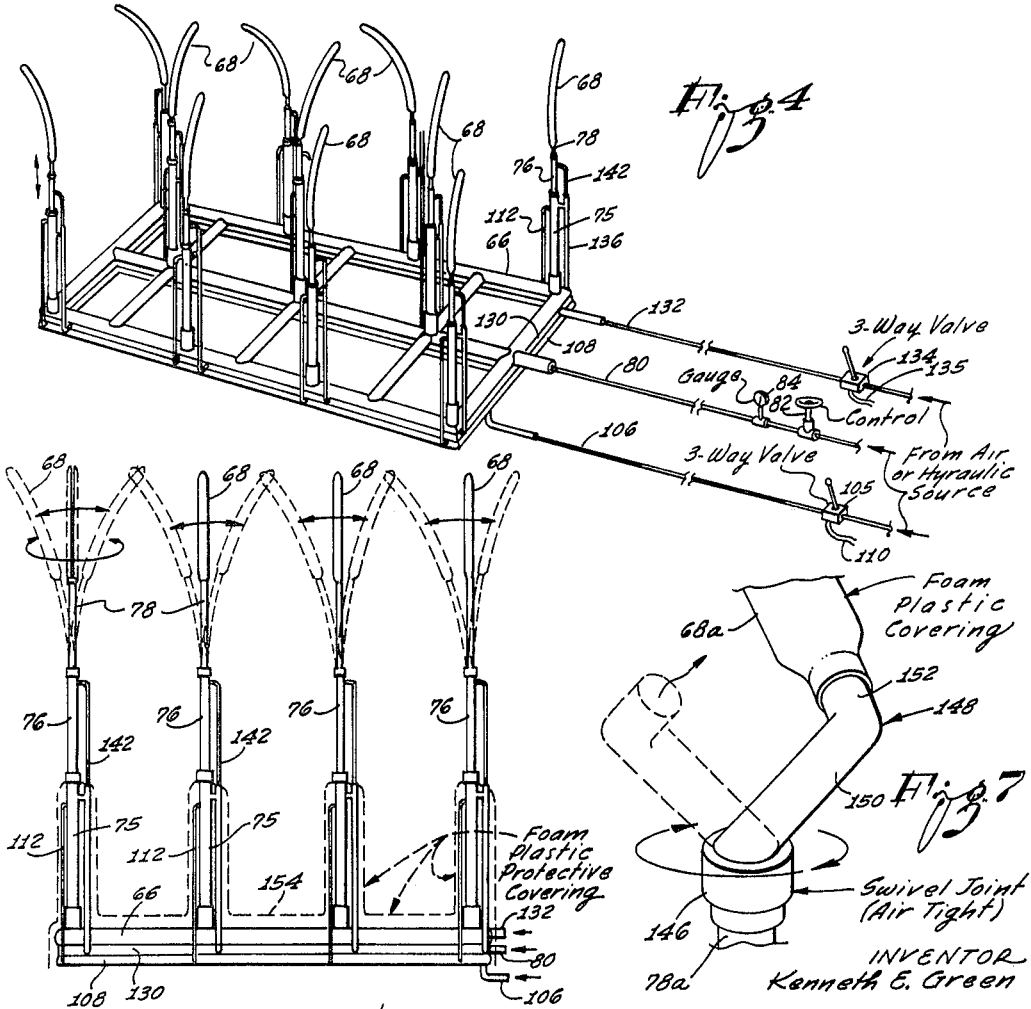

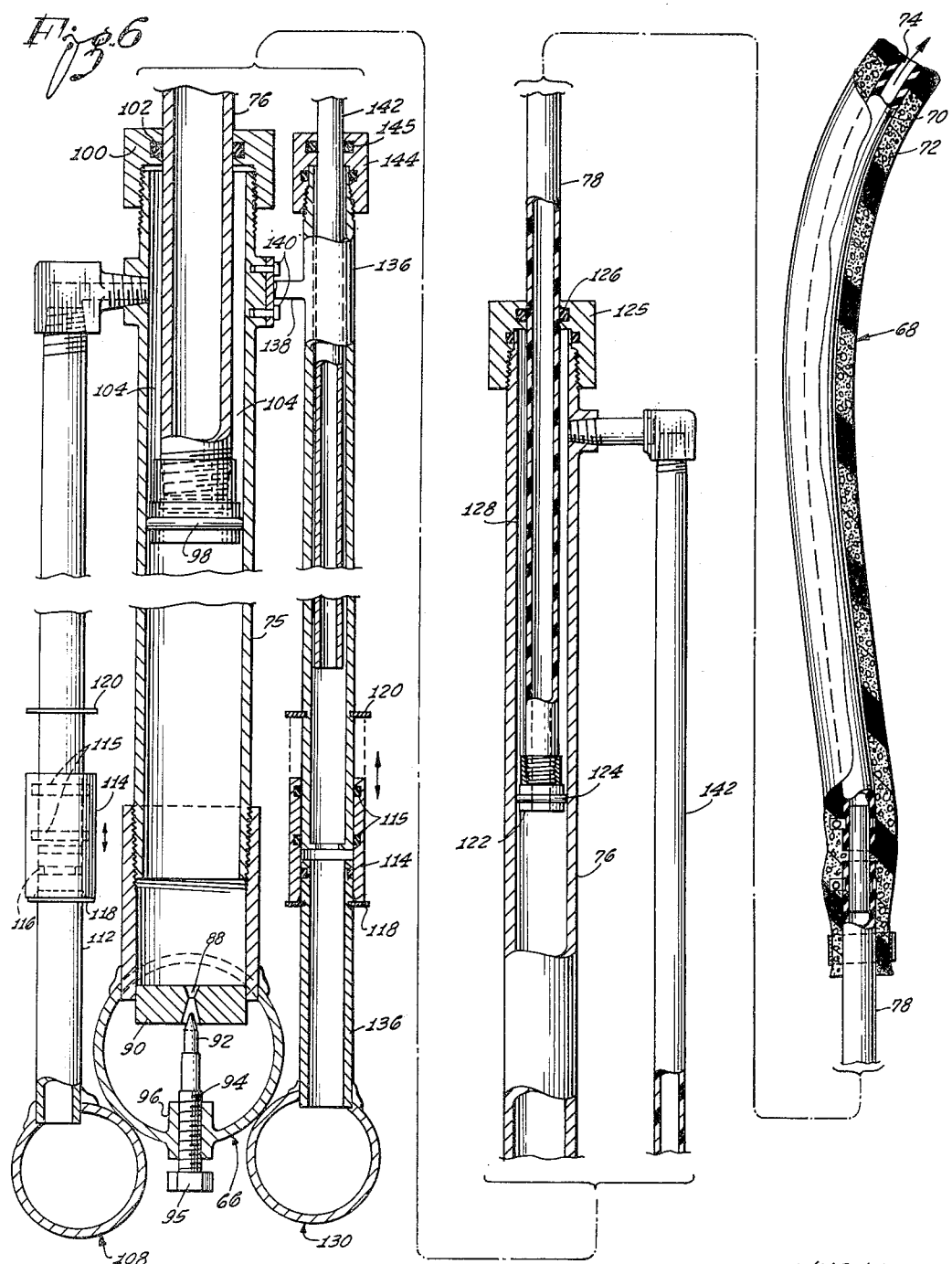

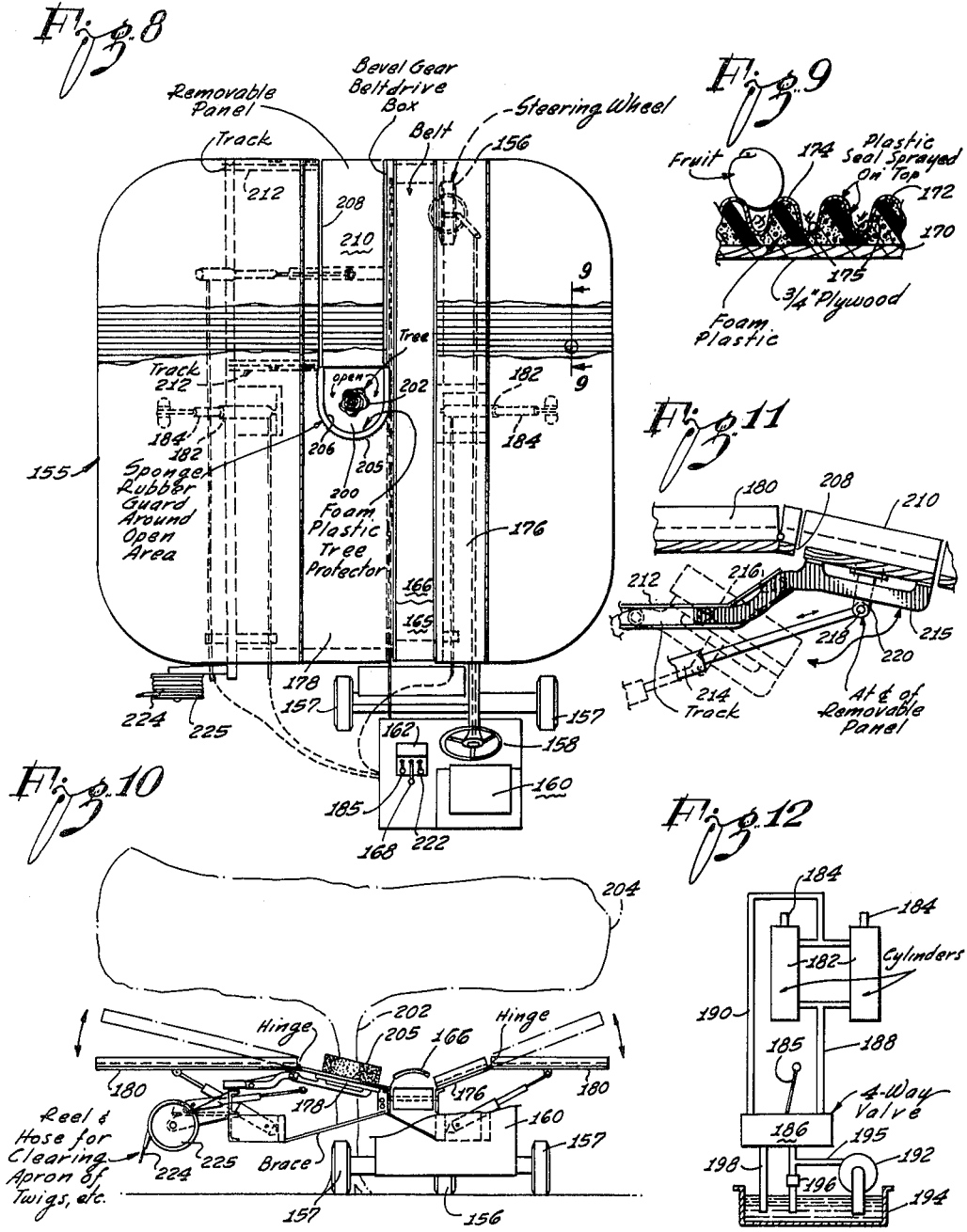

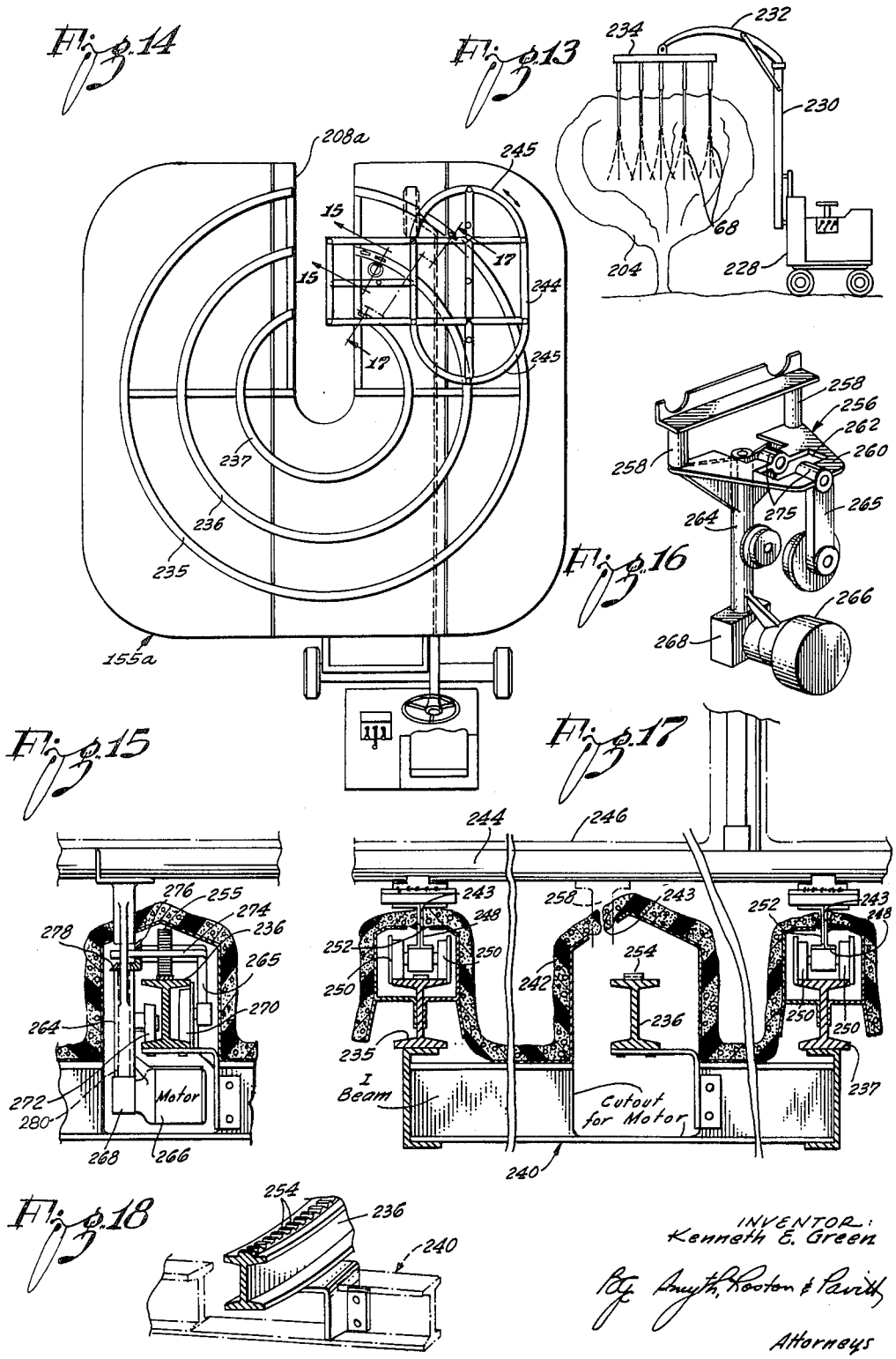

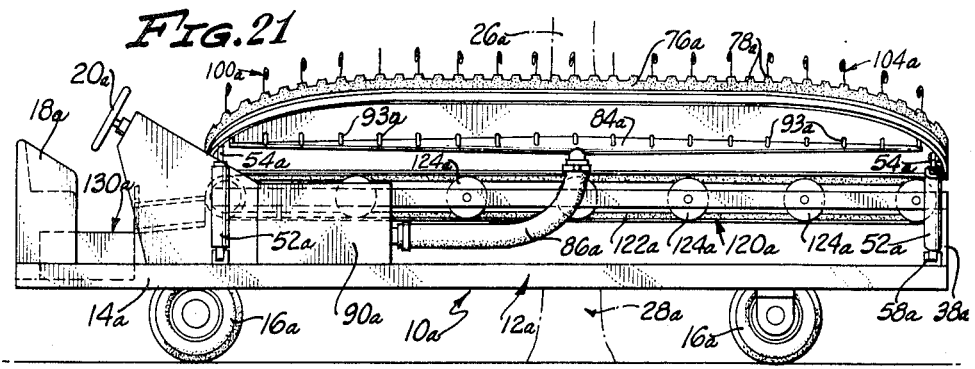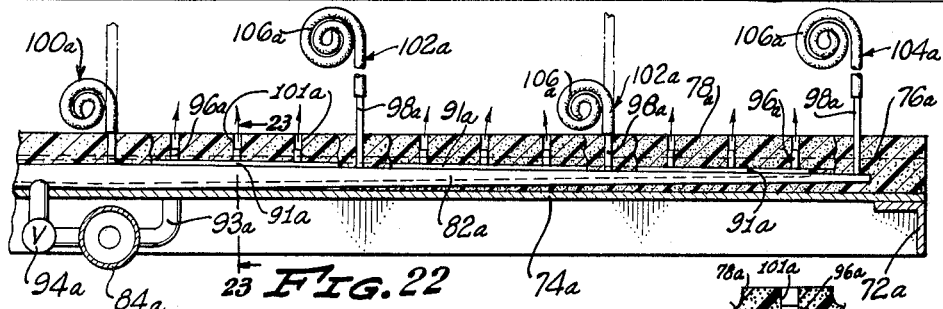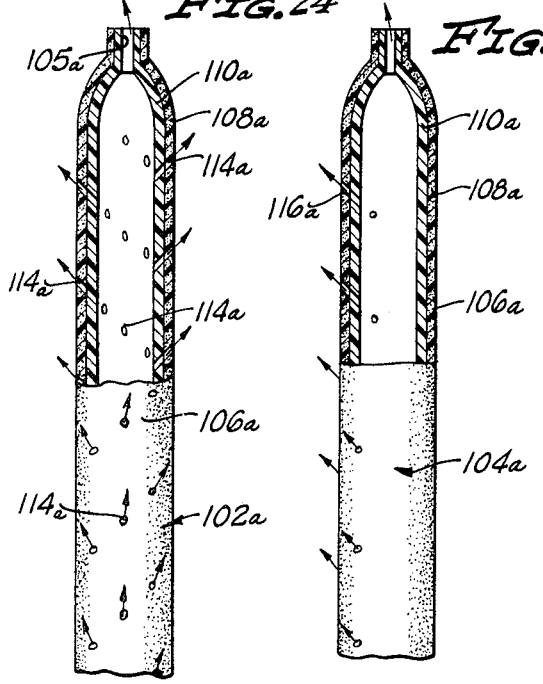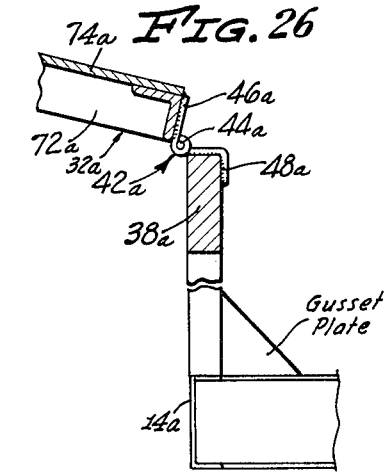

United States Patent Office 3,237,389
Patented Mar. 1, 1966

3,237,389
FRUIT PICKING APPARATUS
Kenneth E. Green, 521 Wisteria Place, Santa Ana, Calif.
Filed Nov. 13, 1962, Ser. No. 237,791
18 Claims. (Cl. 56—328)

This invention relates to apparatus employing fluid-pressure-actuated flipper members for removing fruit from a tree, which apparatus may be employed to thin out fruit on a tree early in the season as well as to harvest fruit on the tree later in the season. This application is a continuation-in-part of my abandoned applications Serial No. 117,751 filed June 16, 1961, entitled, "Fruit Harvester," and Serial No. 218,641 filed August 22, 1962, entitled, "Fruit Picking Apparatus."

A heretofore prevalent procedure for harvesting deciduous fruit from a tree has been to grip the trunk of the tree with a powered device to shake the whole tree and cause the fruit to drop onto a suitable collection apron. The tree trunk may be seriously damaged, however, and it has been found that too often the roots of the tree are damaged if the soil is moist as in an orchard that is heavily irrigated. When this procedure is used to thin out immature fruit, it fails to thin the fruit uniformly, the remaining fruit being left in bunches.

The present invention involves the concept of employing a plurality of flipper members which are actuated by fluid pressure to whip in a random manner to dislodge fruit from a tree. In accord with this concept the flippers may be flexible plastic tubes which are supplied with a pressurized fluid, for example, air or water, and which whip about in reaction to the discharge of the fluid from their outer ends.

An important object of some forms of the present invention is to make it possible to employ the highly effective whipping action of the end portions of the tubular members throughout all the regions of the tree. This object of the invention is accomplished by two provisions, either of which provisions may be used alone or both of the provisions may be used together.

The first provision is to make the array of flippers movable as a group through the tree foliage. To this end, the array of flippers may be mounted on a boom or other suitable extensible and retractible support structure on a vehicle such as a tractor, with the array of flippers mounted on a highly maneuverable boom, for example the array with all the flippers in operation may be moved progressively into and through the tree foliage from various directions.

The second provision is to mount the flippers on tubular supports that are capable of extension and retraction under remote control. With the base portions of the tubular supports stationary and with the flippers in operation, the array of tubular supports may be progressively extended and retracted in length to shift the active flippers from region to region in the tree.

Since utilizing either of these two provisions shifts the actuated flippers progressively through the tree and since the degree of activity of the flippers may be regulated by varying the pressure or rate of fluid supply to the flippers, the new arrangement is highly versatile. The fruit of a tree may be thinned out to a given degree either by employing a mild flipper action for a prolonged period or, on the other hand, by employing a more drastic flipper action for a shorter time period. The fact that the flipper action may be closely controlled makes it possible to use a mild flipper action to dislodge only fully ripened fruit, leaving the remaining fruit to ripen for future picking.

The extensible tubular supports for the individual flippers comprise assemblies of telescoping tubular parts which extend in response to the pressure of the fluid supplied to the flippers. Thus merely turning on the flow of the pressurized fluid creates a force for full extension of the telescoped tubular supports. Suitable means is provided to overcome this extension force whereby the telescoped tubular supports may be retracted to any desired degree while the flippers are operating. In one practice of the invention, the telescoped tubular supports for the flippers are retracted under remote control by purely mechanical means. In another practice of the invention, annular chambers formed by the telescoping members of the tubular supports serve as fluid-pressure means to retract the supports under remote control.

The invention further includes features to improve the flipper action. One feature is the mounting of the flippers on the extensible support in a rotary manner that causes the flippers to rotate as well as to whip in reaction to the flowing streams of fluid. Another feature is the concept of offsetting the flippers relative to their axes of rotation to create moment arms for rotatively driving the flippers. A further important feature is the concept of mounting the highly flexible flippers on less flexible or semi-rigid support tubes that sway substantially in response to the activity of the flippers. For this purpose the uppermost of the telescoping members of the extensible tubular supports may be semi-rigid tubes of rubber or the like. The swaying action of these upper support tubes substantially increases the picking range of the corresponding flippers.

In another practice of the invention the array of flippers for dislodging the fruit and the apron for catching the dislodged fruit are combined in a single mobile support structure which includes means for shifting the array of flippers to various areas of the apron. For this purpose the array of flippers may, for example, be mounted on a rotary arm or may be movable along a curved track that is just above the apron.

In still another practice of the invention, the array of flippers is incorporated in the structure of the fruit-catching apron and extends upward from the apron into the foliage of a fruit tree. Since the apron remains at its low level, it is necessary for the flippers to be extended upward through the entire vertical dimension of the tree foliage to reach all of the fruit. For this purpose the flippers may be in the form of relatively long plastic tubes which are biased to retract by coiling up, the flippers extending by uncoiling when supplied with the pressurized fluid and retracting when the fluid flow is terminated or substantially reduced. In such an arrangement the fruit in the lower regions of the tree is dislodged by the coiling and uncoiling of the tubular members and the fruit in the upper regions is dislodged by the whipping action of the flipper end portions of the tubular members.

The various features and advantages of the invention may be understood from the following detailed description and the accompanying drawings.

In the drawings, which are to be regarded as merely illustrative:

FIG. 1 is a sectional view of a flipper mounted on a tubular support that is capable of extension and retraction;

FIG. 2 is partly a plan view and partly a diagram showing a base structure in the form of a manifold equipped with a plurality of the extensible and retractible supports carrying flippers;

FIG. 3 is a side elevation showing how the base structure of FIG. 2 may be mounted on a vehicle by means of an articulated boom for maneuvering the plurality of flippers relative to a tree;

FIG. 4 is a perspective view of a second embodiment of the invention comprising a base structure or manifold with flippers mounted thereon by extensible and retractible supports of a different construction;

FIG. 5 is a side elevation of the same embodiment;

FIG. 6 is a view on an enlarged scale partly in side elevation and largely in section showing the details of construction of one of the extensible and retractible supports of the second embodiment of the invention;

FIG. 7 is a fragmentary perspective view showing how one of the flippers may be mounted for rotation in reaction to the fluid stream discharged by the flipper;

FIG. 8 is a plan view of a mobile catching apron that may be used in cooperation with an array of flippers for picking deciduous fruit;

FIG. 9 is an enlarged fragmentary cross section taken along the line 9—9 of FIG. 8 showing the corrugated configuration of the surface of the apron;

FIG. 10 is an end elevation of the mobile apron;

FIG. 11 is a fragmentary view partly in section and partly in side elevation showing the mechanism for operating a panel that removably covers a slot in the apron;

FIG. 12 is a diagram of a hydraulic system to control the mobile apron;

FIG. 13 is an elevational view on a reduced scale showing how an array of flippers may be mounted on a vehicle of the character of a fork lift truck to dislodge fruit from a tree;

FIG. 14 is a plan view of a mobile apron provided with a three-rail circular track carrying an array of flippers;

FIG. 15 is an enlarged fragmentary section taken along the line 15—15 of FIG. 14 showing a drive mechanism engaging the central rail for driving the array of flippers around the track;

FIG. 16 is a perspective view of the same drive mechanism;

FIG. 17 is a section taken along the angular line 17—17 of FIG. 14 showing how the array of flippers is provided with wheels riding on the other two rails of the circular track;

FIG. 18 is a fragmentary perspective view of the central rail that is engaged by the driving mechanism of FIGS. 15 and 16;

FIG. 19 is a top plan view of another embodiment of my invention in which the array of flippers is combined with a catching apron;

FIG. 20 is a transverse sectional view taken on the broken line 20—20 of FIG. 19;

FIG. 21 is a side elevational view of the harvester;

FIG. 22 is a sectional view of a portion of the harvester catching apron;

FIG. 23 is a fragmentary section taken along the line 23—23 of FIG. 22;

FIG. 24 is an elevational view of a picking tube with parts broken away and showing in section, the picking tube being adapted to be mounted upon the inner portion of the catching apron, the picking tube being shown in its extended condition;

FIG. 25 is a similar view of a picking tube adapted to be mounted on the perimeter of the catching apron; and FIG. 26 is an enlarged fragmentary sectional view showing a typical hinge connection of the collecting apron of the fruit harvester to the supporting frame therefor.

In the first embodiment of the invention shown in FIGS. 1–3 an array of flippers 20 is mounted on a base structure in the form of a manifold, generally designated 22, which in turn is mounted on a vehicle in the form of a tractor 24 by means of an articulated boom 25, the boom being capable of swinging upward through a range of angles, being capable of extension and retraction, being capable of swinging movement to various directions about a vertical axis and in addition, being capable of tilting the manifold 22 laterally in both directions.

In this particular embodiment of the invention the manifold 22, which is a rectangular grill of welded type approximately three feet wide and seven feet long, is equipped with eleven of the flippers 20, the overlapping circular zones of operation of the eleven flippers being indicated by the circles 26 in FIG. 2. Each of the flippers 20 is in the form of a highly flexible elastomer tube 28 having a casing or jacket 30 of soft foamed elastimer to avoid damage to the fruit. If the flippers are to be used solely for thinning immature fruit, the jackets 30 may be omitted.

The outer end of a flipper 20 is open to form an outlet 32 for discharge of the gaseous fluid. In FIG. 1, the outlet 32 of the flipper 20 is somewhat restricted to increase the velocity of the discharge flow and to raise the pressure of the fluid inside the tube, but in many instances the flipper outlet is not restricted. Since the flipper 20 is highly flexible and the outer end of the flipper is not restrained in any manner, the flipper whips about at random in reaction to the discharge stream from the outlet 32.

Each flipper 20 is mounted on a suitable tubular support that is capable of extension and retraction. In the particular construction shown in FIG. 1 the tubular support is an assembly of telescoping tubular parts comprising three stages. The first stage is a stand pipe or tube 34 that is fixedly mounted in upright position on the manifold 22; the second stage is a tube 35 that is telescopically mounted in the stand pipe 34; and the third stage is a tube 36 that carries the flipper 20 and is telescopically mounted in the tube 35. The first stage pipe 34 has a radially inward flange 38 at its outer end which cooperates with an outer circumferential flange 40 of the second stage tube 35 to limit the extension of the second stage tube and, in like manner, the second stage tube 35 has a radially inward flange 42 at its outer end which cooperates with an outer circumferential flange 44 of the third stage tube 36 to limit the extension of the third stage tube relative to the second stage tube. When a pressurized fluid such as air or water is supplied to the manifold 22 to flow upward through each of the telescoped tubular supports, the pressure of the fluid acting on the inner ends of the second stage tube 35 and the third stage tube 36 exerts substantial force to cause the telescoped tubular support to extend to its maximum length, the restriction of the flipper outlets 32 tending to increase the fluid pressure for this purpose.

A feature of the invention is the provision of means operable by remote control to retract the tubular supports to various degrees. In this particular embodiment of the invention, a plurality of cables 45 is provided for this purpose. The various cables 45 enter the manifold 22 through orifice fittings 46 that are equipped with conventional packing (not shown) to make sealing contact with the cables. The cables 45 are guided by pulleys 47 appropriately located inside and outside of the manifold 22, including a pulley 47a positioned below each of the tubular supports as shown in FIG. 1. All of the cables 45 are routed to the tractor 24 through elongated housing structure 50 of the boom and all of the cables are operatively connected to a single lever 52 on the tractor which may be manipulated to cause the telescoped tubular supports for the flippers to be extended and retracted at will.

The tractor 24 is equipped with a suitable source of compressed air, which, as indicated diagrammatically in FIG. 2, may include a pressure tank 55 supplied with compressed air by a pump 56 driven by an engine 58. The compressed air is supplied to a pipe 60 having a control valve 62 within convenient reach of the operator of the tractor. The pipe 60 is connected to the manifold 22 by means of a flexible hose 65. The outer end of the hose 65 may have numerous branches (not shown) connected to the manifold at various points, for equalizing the supply of air to the various flippers.

In the preferred practice of the invention, the extensible tubular support for each of the flippers 20 is made of yieldable plastic, for example, hard rubber, the three stages 34, 35 and 36 being sufficiently rigid to be operative for their purpose, but, nevertheless, being of yielding character to minimize damage to the branches of a tree. As heretofore stated, an important feature of the preferred practice of the invention is that the third stage tube 36 which carries the flipper 20 is sufficiently flexible to sway through a substantial arc in response to the movements of the flipper. It has been found that this swaying action not only substantially increases the radius of operation of the flipper 20 but is also conducive to a highly desirable snapping action by the flipper to increase its effectiveness for dislodging fruit from a tree.

It will be readily appreciated that this first embodiment of the invention is highly versatile because of the manueverability of the boom 25 and because of the capability of the telescoped tubular supports for the flippers to extend and retract under close control. The operator may elect in his judgment to keep all of the telescoped tubular supports extended to maximum for dislodging fruit from a given tree, the array of flippers being maneuvered solely by the boom 25 to shift to all of the regions in the interior of the tree. On the other hand, the operator may place the manifold 22 stationary in a position such as shown in solid lines in FIG. 3 and then manipulate the lever 52 for variable extension of the telescoped tubular supports to shift the array of flippers to successive regions of the interior of the tree. The apparatus is further versatile in that the rate at which the pressurized fluid is supplied to the flippers may be varied by the control valve 62, the greater the rate of supply of the pressurized fluid, the greater the energy that is expended by the flippers 20.

In a typical embodiment of the invention, the flippers 20 may be approximately 28 inches long with an inside diameter of ⅜″ and an outside diameter ¾″ and each flipper is effective over a radius of approximately 18 inches. The dimension of the effective zone of a flipper measured along the axis of the associated tubular support is approximately 14 inches. In one embodiment of the invention, fluid pressure in the manifold 22 of approximately 26 p.s.i. produces a mild flipper action for light thinning of immature fruit some weeks before harvesting or in a harvesting operation for dislodging only the more mature fruit. 30 p.s.i. produces a more violent action for heavier thinning or heavier harvesting but 40 p.s.i. is too high to avoid damage to even immature fruit.

For relatively light thinning where only one in five of the fruit is to be discarded, relatively low pressure is used, but for heavier thinning where four out of five or nine out of ten of the fruit is to be discarded, a relatively high pressure is used. The operator has the further choice of carrying out relatively heavy thinning or relatively heavy harvesting either by prolonged application of the flippers at low fluid pressure or briefer application at higher fluid pressure. It is apparent that the rate at which the flippers are shifted progressively through the interior of the tree is a consideration since the same effect may be achieved either by a violent flipper action with the flippers shifted relatively rapidly through the foliage of the tree by a milder flipper action with the flippers shifted relatively slowly through the foliage of the tree.

The foamed elastomer jackets 30 of the flippers not only minimize damage to the fruit but also cooperate with the resilient inner tubes 28 of the flippers to cause the flippers to bounce upon impact against a branch. It is to be noted that the third stage tube 36 is freely rotatable in the second stage tube 35 so that the flippers 20 that are carried by the third stage tube are rotatable therewith as well as being free to whip in random directions. The flippers rotate continuously with the rate of rotation increasing with increasing fluid pressure. The rotation of the flippers and the snapping whipping action in random directions with the flippers bouncing from branch to branch results in the flippers, in effect, seeking out all of the fruit within their radius of operation.

If this first embodiment of the invention is to be used to harvest ripe fruit as distinguished from thinning immature fruit, it is employed in cooperation with a catching apron in a manner that will be described hereafter. In that event the manifold 22 will be covered with soft resilient material to avoid damage to the falling fruit. For this purpose the manifold may be covered with soft foamed plastic of substantial thickness. For example, the manifold may be covered with a layer at least one inch thick, of foamed polyurethane or foamed rubber.

FIGS. 4–6 show a second embodiment of an array of flippers that may be substituted for the array of the first described embodiment of the invention. The base structure of this second embodiment includes a manifold 66 having a plurality of extensible and retractible telescoped tubular supports carrying a corresponding plurality of flippers 68 of the character heretofore described. As best shown in FIG. 6, each flipper 68 has an inner tube 70 and an outer foamed plastic jacket 72. In this instance the outlets 74 (FIG. 6) of the flippers are not restricted.

In the general manner heretofore described, each of the telescoped tubular supports for the flippers 68 has a first stage stand pipe 75 fixedly mounted on the manifold 66, a second stage tube 76 that is slidingly telescoped into the first stage stand pipe, and a third stage tube 78 that is telescoped into the second stage tube, the flippers 68 being mounted on the outer end of the third stage tube. The manifold 66 together with the first stage pipes 75 may be made of aluminum and the second stage tubes 76 may be made of stainless steel, but the third stage tube 78 is preferably made of a plastic for flexibility to sway in the manner heretofore described. As indicated diagrammatically in FIG. 4, the manifold 66 is supplied with water under pressure or compressed air, whichever is desired, by means of a hose 80. The fluid from a suitable source is supplied to the hose 80 through a control valve 82 which may be adjusted to regulate the flow of the fluid, the pressure of the fluid on the downstream side of the control valve being indicated by a gauge 84.

A feature of this embodiment of the invention is the concept of restricting the flow of the fluid from the manifold 66 to the various flippers 68 in a manner to cause substantially equal distribution of the manifold fluid to the various flippers. For this purpose the flow from the manifold to each flipper is controlled by a corresponding needle valve as shown in FIG. 6. The base end of each of the first stage pipes 75 is closed by a disk 90 having a tapered axial port 88 through which the fluid flows from the manifold to the telescoped tubular support for the flipper. A needle valve member 92 to control flow through the port 88 is part of a screw 95 threaded into a nipple 96. It is apparent that the screw 95 may be adjusted to vary the rate of fluid flow through the axial port 88. It is also apparent that the various screws 95 may be adjusted for equalization of the supply to the various flippers 68.

As shown in FIG. 6, the lower end of the second stage tube 76 is embraced by an O-ring 98 that makes sealing contact with the surrounding first stage stand pipe 75. The upper end of the first stage stand pipe 75 is equipped with a bushing 100 which has an inner circumferential groove seating an O-ring 102 in sealing contact with the outer circumference of the second stage tube 76. This construction provides an annular chamber 104 which contracts in length and volume when the second stage tube 76 extends relative to the first stage stand pipe 75. As heretofore pointed out, the pressure of the fluid that is supplied to a flipper 68 through the tubular support tends to cause the second stage tube 76 to extend relative to the first stage stand pipe 75 and causes the third stage tube 78 to extend relative to the second stage tube. A feature of this second embodiment of the invention is the concept of supplying fluid under pressure to the various annular chambers 104 to cause the various second stage tubes 76 to retract relative to the corresponding first stage stand pipes 75.

Suitable fluid, preferably water, is supplied from a suitable source through a three-way valve 105 and a hose 106 to a second manifold 108. When the control handle of the three-way valve 105 is placed in one position it connects the high pressure source to the manifold 108 and when the control handle is placed in the opposite position it connects the manifold with a low pressure return pipe 110. The manifold 108 is of the same general configuration as the main manifold 66 and is positioned close against the main manifold.

The manifold 108 is connected to each of the annular chambers 104 by means of a pipe 112 which is made in two sections which may be separated when desired. The two sections are interconnected by a sleeve 114, the joint between one section and the sleeve being sealed by O-rings 115 carried by the sleeve and the joint between the other section and the sleeve being sealed by an O-ring 116 carried by the other section. The sleeve 114 normally abuts a lower snap ring 118 but may be retracted against an upper snap ring 120 to permit separation of the two sections of the pipe 112.

The third stage tube 78, which is made of moderately flexible plastic, has a metal bushing 122 at its lower end carrying an O-ring 124 in sealing contact with the surrounding second stage tube 76. The upper end of the second stage tube 76 is provided with a bushing 125 which carries an inner circumferential O-ring 126 in sealing contact with the outer circumferential surface of the third stage tube 78. This construction forms a second upper annular chamber 128 which contracts in volume when the third stage tube 78 extends relative to the second stage tube 76.

Fluid under pressure from a suitable source, preferably water, is supplied to all of the upper annular chambers 128 by means of a third manifold 130. The fluid is fed to the manifold 130 through a hose 132 and a three-way valve 134, the three-way valve being connected to a suitable low pressure return pipe 135. The third manifold 130 is of the same general configuration as the other two manifolds, the three manifolds being positioned close together.

As shown in FIG. 6, a pipe 136 extends upward from the third manifold 130 for supplying fluid to each of the upper annular chambers 128. The pipe 136 is stabilized by an integral bracket 138 that is secured to the corresponding first stage stand pipe 75 by suitable screws 140. The pipe 136 is made in two sections which are releasably interconnected by a sleeve 114 in the manner heretofore described, with O-rings 115 and 116 making the joint fluid-tight. As indicated in dotted lines the sleeve 114 may be retracted upward from a lower snap ring 118 to an upper snap ring 120 for separation of the two sections of the pipe 136.

Since the upper annular chamber 128 is movable towards and away from the manifold 130, it is connected to the pipe 136 by a second smaller pipe 142 which variably telescopes into the pipe 136. To seal the sliding joint between the two pipes 136 and 142, the upper end of the pipe 136 is provided with a bushing 144 which carries an inner circumferential O-ring 145 in sealing contact with the periphery of the pipe 142.

When fluid under pressure is supplied to the main manifold 66 all of the flippers 68 are activated and all of the tubular supports for the flippers comprising the first stage stand pipe 75, the second stage tube 76 and the third stage tube 78 tend to extend to whatever degree is permitted by the presence of fluid in the two sets of annular chambers 104 and 128. Assuming that all of the telescoped tubular supports are contracted to the maximum with the two sets of annular chambers 104 and 128 full of water, progressive extension of the telescoped tubular supports is carried out by first releasing fluid from the upper annular chambers 128 to permit full extension of the third stage tubes 78. After the third stage tubes 78 are extended to the maximum, water is released progressively from the lower annular chambers 104 to permit the second stage tubes 76 to extend relative to the first stage stand pipes 75. Thus the operator first manipulates the two-way valve 134 for extension of the third stage tubes 78 and then manipulates the three-way valve 105 for extension of the second stage tubes 76.

When the array of flippers is extended to its maximum, the reverse procedure is followed for retracting the flippers. First the three-way valve 105 is manipulated to fill the lower annular chambers 104 with water for retraction of the second stage tubes 76 and then the three-way valve 134 is manipulated to fill the upper annular chambers 128 with water for progressive retraction of the third stage tubes 78. It is required, of course, that the water supplied to the two sets of annular chambers 104 and 128 be at sufficiently high pressure to cause the retraction of the tubular members in opposition to the pressure of the fluid that flows through the tubular supports to the flippers.

The flippers 68 are rotatable about the axes of the third stage tube 78 because the third stage tubes 78 are free to rotate relative to the second stage tubes 76. If desired, however, the flippers 68 may be mounted on the third stage tubes 78 by means of swivel joints. FIG. 7 shows such a swivel joint 146.

In FIG. 7 illustrating a modification of the invention, the swivel joint 146 is at the upper end of a third stage tube 78a. The corresponding flipper 68a is connected to the swivel joint 146 by an angular tube 148 having a lower leg 150 and an upper leg 152. The axis of the upper leg 152 is offset from the axis of the third stage tube 78a so that the reaction thrust from the fluid discharged from the flipper 68a creates a moment to rotate the angular tube 148 in the manner indicated by the arrows.

Here again, if the second embodiment of the invention is used solely for thinning fruit, no precautions are necessary to prevent bruising of the falling fruit. If the embodiment is employed to pick ripe fruit, however, the three manifolds and at least the first stage stand pipes 75 of the telescoped tubular supports should be covered with a layer of soft yielding foam plastic as indicated in broken lines at 154 in FIG. 5.

FIGS. 8–12 show the construction of a mobile catching apron 155 that may be used with either of the two described flipper assemblies for harvesting ripe fruit. The apron 155 which preferably is self-propelled, is mounted on an understructure supported by a forward ground wheel 156 and two rearward ground wheels 157, the forward wheel being steered by a steering wheel 158. A seat 160 is provided for the operator with a control box 162 within convenient reach.

The apron 164 is designed to cause fruit that lands on the apron to roll onto a power-actuated conveyor belt 165 which is mounted in the usual manner on rollers. To keep fruit from dropping onto the fruit that is being carried by the conveyor belt 165, the conveyor belt is protected by an elevated shield 166, the shield being curved so that fruit that lands on the shield will roll off of the shield. The shield 166 is covered with a thick layer of foamed plastic such as polyurethane and the shield is elevated sufficiently to permit fruit to roll under the shield onto the conveyor belt 165. The conveyor belt 165 which is controlled by a handle 168 on the control box 162 delivers the collected fruit continuously to suitable containers positioned at the edge of the apron.

The whole upper surface of the apron 155 is covered with a thick layer 170 (FIG. 9) of soft yielding foamed plastic such as foamed polyurethane and the surface of the foamed plastic is sprayed to produce a polyvinyl surface layer 172 which provides a smooth unbroken surface that seals off the interior of the foamed plastic. The foamed plastic layer 170 is of a corrugated configuration which provides ribs 174 which are inclined to guide the fruit to the conveyor belt 165. The ribs 174 form channels 175 that are narrower than the diameter of the fruit that is being harvested. Any twigs or other debris that drops onto the apron falls into the channels 175 so that fruit falling onto the apron will not strike the accumulated debris with consequent damage to the fruit.

The apron 155 has two inclined longitudinal panels 176 and 178 that extend along opposite sides of the conveyor belt 165 and form a fixed trough with the conveyor belt at the bottom of the trough. Hingedly mounted along the outer edges of the two panels 176 and 178 are two wings 180 of the apron 155 which wings serve as continuations of the sloping sides of the trough. The inclination of the two wings 180 is controlled by two corresponding hydraulic cylinders 182. The lower end of each of the hydraulic cylinders 182 is pivotally mounted on the understructure 156 with a piston rod 184 extending from the upper end of the cylinder and pivotally connected to the underside of the corresponding wing.

The two wings 180 may be adjusted in inclination and hydraulically locked at adjusted positions by means controlled by a handle 185 on the control box 162. As shown in the diagram in FIG. 12, the handle 185 controls a four-way valve 186 which is connected to one end of each of the two cylinders 182 by a pipe 188 and is connected to the other ends of the two hydraulic cylinders by a pipe 190. A pump 192 which draws water from a reservoir 194 is connected by a pipe 195 both to the four-way valve 186 and to a relief valve 196 that returns surplus fluid to the reservoir 194. The four-way valve has a discharge port connected to a return pipe 198 for returning water to the reservoir 194.

When the handle 185 is swung to one limit position, it connects the pump 192 with one end of each of the two hydraulic cylinders 182 and connects the other end of each cylinder to the return pipe 198. At the second limit position the four-way valve reverses the flow through the two cylinders 182 and at a central neutral position of the handle 185 all ports of the four-way valve are closed for hydraulically locking the apron wings 180 at adjusted positions.

The apron 155 is provided with a central opening 200 to receive the trunk 202 of a tree 204 and this opening is surrounded by a rubber guard 205 to divert rolling fruit away from the opening. The central opening 200 has a thick lining 206 of foamed plastic to cushion any impacts against the tree trunk 202 to avoid damage to the tree trunk.

To permit the apron 155 to be placed in a position with the trunk 202 of a tree in the central opening 200, the panel 178 of the apron is cut away to provide a radial slot 208 of adequate width to clear tree trunks. Normally the radial slot 208 is closed by an auxiliary panel 210 which may be removed when desired by remote control. For this purpose the auxiliary panel 210 is mounted on a pair of tracks 212 under the apron and is controlled by a hydraulic cylinder 214. Two angular brackets 215 fixedly secured to the underside of the auxiliary panel 210 are provided with spaced rollers 216 which ride along the corresponding tracks 212. The two tracks 212 are angular to guide the auxiliary panel to a retracted position indicated in dotted lines in FIG. 11 to permit a tree trunk to pass through the radial slot 208.

The lower end of the hydraulic cylinder 214 is pivotally connected to the understructure 156 and the piston rod extending from the upper end of the hydraulic cylinder is connected by a pivot pin 218 to a bracket 220 on the underside of the auxiliary panel. The hydraulic cylinder 214 is controlled by the same type of hydraulic system as shown in FIG. 12, the four-way valve of the hydraulic system having a handle 222 on the control box 162.

It is apparent that the operator of the mobile apron may prepare to approach a tree by manipulating the handle 222 to lower the two apron wings 180 to clear the lower foliage of the tree and by manipulating the handle 185 to cause the auxiliary panel 210 to be retracted laterally from the radial slot 208. The operator may then maneuver the apron to cause the tree trunk to enter the radial slot 208 to position the apron with the tree trunk in the central opening 200 of the apron. The operator may then manipulate the handle 185 to return the auxiliary panel 210 to its normal operating position and may manipulate the handle 222 to swing the two apron wings 180 upward to desired degrees of inclination, the inclination depending upon the fruit that is being harvested. Finally the operator manipulates the handle 168 to start the conveyor belt 165.

It is contemplated that provision will be made for using water or compressed air applied by a hose to flush debris out of the channels 175 of the apron. For this purpose a hose 224 may be provided on a reel 225 mounted on the mobile apron as shown in FIGS. 8 and 9. For the same purpose a hose may also be mounted on a reel on the tractor that carries the array of flippers, such a reel being shown at 226 in FIG. 3.

FIG. 13 shows how an array of flippers may be mounted on a vehicle 228 of the character of a lift fork truck whereby the array of flippers in upside down position may enter a tree 204 from above. The truck 228 has a vertically extensible support structure 230 of a well-known construction which carries an overhead boom 232 upon which the array of flippers is mounted. The flipper assembly may be the same as in the embodiment of the invention illustrated by FIGS. 4–6, the assembly including a base structure 234 comprising the three previously described manifolds 66, 108 and 130, the flippers 68 being suspended from the base structure by the previously described extensible and retractible tubular supports.

FIGS. 14–18 illustrate another embodiment of the invention in which the apron and the array of flippers are incorporated in a single mobile structure. In FIG. 14 the apron, generally designated 155a is of the same general construction as the previously described apron 155 in FIG. 8, as indicated by the use of corresponding numerals to indicate corresponding parts.

The support structure of the apron 155a carries three concentric circular I-beam rails 235, 236 and 237 which terminate at the opposite edges of the slot 208a and which are interconnected and supported by an elevated frame 240 as indicated in FIG. 17. The three rails and the members of the elevated frame 240 have a covering 242 of soft foamed plastic to avoid damage to falling fruit, the foamed plastic covering having three slits 243 (FIG. 17) corresponding to the three rails.

The flippers (not shown) are mounted on a base structure 244 which may comprise three manifolds as heretofore described. The base structure is of the same rectangular configuration as heretofore described but has additional arcuate extensions 245 (FIG. 14) on its opposite sides which at one position of the base structure on the three rails extends over the area of the slot 208a. The base structure and at least the lower parts of the extensible tubular supports thereon are covered by a layer of suitable foamed plastic as indicated at 246 in FIG. 17.

The base structure 244 is movably supported on the two rails 235 and 237 by a plurality of downwardly extending legs 248, each of which carries a pair of flanged wheels 250. The legs 248 are made relatively thin and extend through narrow slots 252 in the foamed plastic layer 242. For the purpose of driving the base structure 244 around the three-rail track, the middle rail 236 is formed with cogs 254 on its upper surface for engagement by a gear or cog wheel 255. The cog wheel 255 is carried by a bracket 256 shown in FIG. 16 that is rigidly suspended from the base structure 244 by a pair of arms 258. The bracket 256 includes a horizontal plate 260 with a rectangular aperture 262 to clear the cog wheel 255. Extending downward from the bracket plate 260 is a pair of bracket arms 264 and 265, the bracket arm 264 being tubular and carrying a drive motor 266 and an associated gear box 268 at its lower end. Mounted on the lower end of the bracket arm 265 is a flanged wheel 270 which engages one side of the central rail 236 and a beveled wheel 272 mounted on the bracket arm 264 engages the other side of the rail.

The driving cog wheel 255 is mounted on a short shaft 274 that is journalled in spaced bearings 275 (FIG. 16) in the bracket plate 260. Mounted on the end of the shaft 274 and keyed thereto is a beveled pinion 276 in mesh with a second beveled pinion 278 on a drive shaft 280, the drive shaft being journalled in the tubular bracket arm 264 and being driven by the drive motor 266. Suitable limit switches (not shown) deenergize the drive motor 266 automatically whenever the base structure 244 reaches either of the two opposite ends of the three-rail track.

The manner in which this last embodiment of the invention serves its purpose may be readily understood from the previous discussion of the other embodiments. The operator maneuvers the apron into operating position under a tree in the usual manner and energizes the drive motor 266 under remote control to shift the base structure 244 around the three-rail track as desired. Under automatic control the flippers are energized to whatever degree is appropriate and the telescoped tubular support structures are extended and retracted to shift the energized flippers vertically throughout the interior of the tree.

Referring now to FIG. 19, I show a fruit harvester 10a manufactured in accordance with the teachings of my invention and including a mobile support 12a constituted by a bed 14a supported upon wheels 16a. In the present embodiment of my invention the mobile support 12a is self-powered and includes a drive motor, not shown, and a driver's seat 18a and a steering wheel 20a Therefore, the particular embodiment of the fruit harvester 10a disclosed herein can be driven from grove to grove during the harvesting season and can be moved, as will be apparent from the disclosure hereinbelow, from tree to tree once the grove has been reached. However, it is not intended that the teachings of the invention be limited to any particular type of support for the harvester of my invention, since it will be obvious to those skilled in the art that a tractor-drawn bed or other means of movably supporting the same may be utilized in substitution for the mobile support 12a.

The bed 14a is characterized by the incorporation of an elongated slot 24a therein which, as best shown in FIGS. 19 and 20 of the drawings, is adapted to permit the bed 14a to be disposed in encompassing relationship with the trunk 26a of a tree 28a from which fruit is to be picked. The open end of the slot 24a may be closed by a gate or similar rigidifying member, not shown, in order to rigidify the bed 14a of the mobile support 12a in a manner that will be readily apparent to those skilled in the art.

Mounted in operative relationship with the bed 14a is a catching or collecting apron 30a which, in the present embodiment of the invention, is constituted by first and second portions 32a and 34a which are hingedly mounted, as best shown in FIGS. 20 and 26 of the drawings, on a longitudinally extending support frame 38a which is disposed upon and secured to the upper surface of the bed 14a.

The hinge connections 42a, as best shown in FIG. 26 of the drawings, include conventional hinge constructions 44a whose leaves 46a and 48a are suitably attached respectively, to corresponding portions of the apron frame 72a and support frame 38a. Operatively connected to the opposite extremities of the first and second portions 32a and 34a, respectively, of the catching apron 30a are hydraulic jacks 52a which incorporate extensible piston rods 54a adapted to raise or lower the opposed first and second portions 32a and 34a of the catching apron 30a.

As will be obvious to those skilled in the art, the harvester 10a must be sufficiently narrow to permit it to pass between adjacent rows of trees in a grove. Therefore, when the hydraulic jacks 52a are energized to cause the extension of the piston rods 54a therefrom, said hydraulic jacks 52a being connected to a source of pressure fluid, not shown, the oppositely disposed first and second portions 32a and 34a are folded upwardly toward each other until the upper surfaces thereof are disposed oppposite each other and the maximum width of the entire fruit harvester 10a is equivalent to that of the bed 14a of the mobile support 12a.

As a matter of fact, the lower extremities of the hydraulic jacks 52a are pivotally secured, as at 58a to the bed 14a and the upper extremities of the piston rods 54a are pivotally secured, as at 62a to permit rotation of the hydraulic jacks 52a and the incorporated piston rods 54a in order that the oppositely disposed portions 32a and 34a of the apron 30a may be moved toward each other.

However, when a tree 28a is to be picked, in a manner to be described in greater detail below, the oppositely disposed first and second portions 32a and 34a, respectively, of the apron 30a are lowered with respect to the hinged edges thereof.

In order to permit the apron 30a to encompass the trunk 26a of a tree 28a the first portion 32a thereof is provided with a pivoted section 64a which is hingedly connected, as at 66a, to the remainder of the first portion 32a of the apron 30a. Therefore, when the slot 24a in the bed 14a is aligned with the trunk 26a of the tree 28a and prior to the immediate juxtaposition of the bed 14a to said tree, the hinged section 64a of the first portion 32a of the apron 30a is pivoted outwardly into the position shown in FIG. 19 of the drawings. It should also be noted that the hinged section 64a is provided with a segment of a diaphragm 68a which is intended to encompass the trunk 26a of the tree 28a and which is deflectable in order to permit trees whose trunks are of different diameters to be accommodated while still preventing fruit from falling between the portions of the apron 30a continuous to the trunk of the tree and said trunk.

Of course, the hinged connection 42a for the pivotal section 64a of the first portion 32a of the apron 30a must include a removable latch pin in order that the pivotal section 64a may be pivoted outwardly to the position shown in FIG. 20 of the drawings. After the pivotal section 64a has been moved outwardly, the rigidifying gate, now shown, at the end of the slot 24a in the bed 14a is opened and the mobile support 12a is advanced until the portion of the diaphragm 68a remaining in operative relationship with the first and second portions 32a and 34a of the apron 30a engages the perimeter of the tree trunk 26a. After this has occurred the pivotal section 64a can be swung inwardly and the latch pin associated therewith replaced to lock the pivotal section into position.

While I have disclosed the catching apron 30a as being of substantially square configuration with the oppositely disposed portions thereof being hingedly movable with respect to the supporting frame 38a therefor so that the apron can be caused by the action of the hydraulic jacks 52a to assume a more or less substantially V-shaped configuration, it will, of course, be obvious to those skilled in the art that various configurations may be imparted to the catching apron without diverging from the spirit of the invention. For instance, a concavo-convex apron may be provided and, instead of the utilization of the pivotal section 64a, a slot in the side wall thereof may be exposed by the removal of a hinged or sliding panel in the side of the apron. Moreover, elevating means other than the jacks 52a may be utilized to raise and lower the oppositely disposed portions of the apron with respect to each other and, where different configurations other than that shown are incorporated, it is necessary to provide removable segments in order that said portions may be raised toward each other.

Each of the portions 32a and 34a of the apron 30a is constituted, as best shown in FIG. 22 of the drawings, by a perimetrical frame 72a which supports a base plate 74a. The frame and base plate may be fabricated, respectively, from angle iron and sheet metal and may be welded or riveted together. Superimposed upon the base plate 74a as best shown in FIGS. 19, 20 and 22 of the drawings, is a layer 76a of resilient material, such as polyurethane foam, polyethylene foam, or foamed rubber, the upper surface of which is provided with a plurality of ribs 78a defining corrugations which extend inwardly from the outer edge to the inner edge of each of the portions 32a and 34a of the apron 30a. The layer 76a of resilient material can be fabricated from any suitable substance analogous to those previously mentioned hereinabove and may be secured to the upper surface of the base plate 74a by a suitable adhesive such as air drying cement. Embedded in the layer 76a of resilient material is a plurality of transversely extending fluid channels 82a which, as best shown in FIG. 22 of the drawings, communicate with a longitudinally extending duct 84a which is connected to a flexible conduit 86a whose input end is, in turn, connected to the output of a source of pressure fluid, such as air, schematically indicated at 90a in FIG. 21 of the drawings.

Also incorporated in the layer 76a of resilient material is a plurality of longitudinally extending fluid channels 91a which are connected to the duct 84a by means of a transversely oriented connecting channel 93a.

A preferable source 90a of pressure air would be either an extremely high rate compressor or an axial flow turbine. Interposed between the duct 84a and the channels 82a is a rotary or similar type valve 94a which causes the pressure in the channels 82a to pulsate by alternately permitting and cutting off the flow of air pressure to said channels.

Each of the channels 82a incorporates a plurality of outlets 96a, as best shown in FIG. 22 of the drawings. Operatively connected to the outlets 96a by means of fittings 98a are extensible-retractable picking devices 100a. The picking devices 100a are constituted by elongated plastic tubular members 102a and 104a whose upper extremities are, as best shown in FIG. 22 of the drawings, preformed into a spiral 106a. It is also possible to provide other types of picking devices 100a which may be in the form of expansible bellows or the like. It will be noted that the fittings 98a are preferably formed from plastic, such as polyethylene, or one of the acrylic plastics to provide for minimum abrasion of fruit contacting the same.

It will be noted that the channels 93a have air outlets or vents 101a which do not have fruit picking devices 100a associated therewith. The air outlets or vents 101a constitute means for creating a continuous cushion of air at the apices of the ribs 78a to cushion falling fruit against possible damage. The air outlets 101a are interspersed among the air outlets 96a with which the picking devices 100a are associated to insure uniformity of distribution of the air cushion.

Furthermore, the elongated picking devices 100a will be located upon the upper surface of the apron 30a in positions and concentrations determined by the typical pattern of the fruit upon the tree to be harvested. For instance, where peaches are to be harvested the concentration of picking devices will be established in an area of approximately three to seven feet from the trunk of the tree. Of course, a less dense arrangement of picking devices 100a will be employed over the entire contemplated maximum area of the tree.

The picking devices 100a will be of different lengths, the longest being on the trunk or low side of the portions 32a and 34a of the catching apron 30a while the shortest are found adjacent the perimeter of said portions in order that a relatively equal height may be attained by all of the picking devices so that a uniform height distribution may be achieved.

Each of the elongated tubular members 102a and 104a constituting the picking devices 100a has a composite structure provided thereupon in the spiral area 106a thereof, said composite construction including, as best shown in FIGS. 24 and 25 of the drawings, an outer layer 108a of a relatively soft foam-like plastic, such as polyurethane or polyether and an inner relatively homogeneous layer 110a of a flexible plastic such as polyethylene or the like.

Thus, when the elongated tubular members 102a and 104a are subjected to pressure air from the pressure source 90a the upper spiral extremities 106a thereof will extend rigidly and will whip about among the fruit clusters and strike the same to dislodge the fruit from the tree. As best shown in FIGS. 24 and 25 of the drawings, the inner groups of the elongated tubular members 102a are provided with a plurality of air outlet orifices 114a about their entire perimeters and a relatively dense cushion of air surrounds the perimeters of the elongated tubular members 102a. On the other hand, the perimetrical elongated tubular members 104a disposed at the edges of the apron 30a are characterized by the provision of air outlet openings 116a in only the areas thereof which face inwardly from the outer edges of the apron 30a.

It will be noted that the upper extremities of the tubular members 102a and 104a are adapted to automatically constrict when the pressure in said members drops and to open when subjected to pressure to cause said members to whip among the boughs of the tree being picked. The automatic closing of the opening 105a of the upper extremities of the members 102a and 104a can be attained by preforming the plastic or by the insertion of a light spring, not shown, at said upper extremities.

The picking action of the upper coiled extremities 106a of the picking devices 100a, as constituted by the elongated tubular members 102a and 104a, is characterized by three basic patterns. In the first place, the spiral upper extremities 106a of the elongated tubular members 102a and 104a extend and retract rapidly as the flow of air from the source of pressure air is impressed upon said upper extremities.

In the second place, the flow of air and the uncoiling action of the spiral extremities 106a of the elongated tubular members 102a and 104a causes the upper extremities of said members to whip among the clusters of fruit and to strike the same. The striking action of the elongated tubular members 102a and 104a against the clusters of fruit is cushioned by the resilient, soft outer layer 108a so that the fruit is not subjected to greater contact pressure than would be exerted by the fingers of a fruit picker.

Moreover, the blasts of air from the outlet orifices or openings 114a and 116a also serve to dislodge the ripe fruit from the clusters thereof and in addition, accelerate the whipping action of the upper extremities of the elongated tubular members 102a and 104a, said whipping motion being caused by the intermittent opening of the end openings or vents 105a in the members 102a and 104a.

Mounted intermediate the lower edges of the first and second portions 32a and 34a of the apron 30a is an elongated conveyor 120a which, as best shown in FIGS. 20 and 21 of the drawings, is supported on the support frame 38a and is of conventional construction including a conveyor belt 122a and supporting rollers 124a thereof.

However, it will be noted that, as best shown in FIGS. 19 and 20 of the drawings, the conveyor 120a is isolated from dropping fruit by an elongated shield 126a, said shield being provided with a layer of corrugated polyethylene or polyurethane foam and being convex to direct the fruit falling thereupon to the opposite sides of the conveyor 120a.

It will be noted that the conveyor shield 126a is spaced above the belt 122a to define continuous lateral side openings 128a, as best shown in FIG. 20 of the drawings, to receive fruit which runs down the corrugations defined by the ribs 78a provided on the upper surface of the resilient layer 76a. Located at the discharge end of the conveyor 120a is a suitable grading apparatus (not shown) which discharges the various grades of fruit into corresponding receptacles 130a in FIG. 19 of the drawings.

The spiral configuration of the upper extremities 106a of the elongated tubular members 102a and 104a may be achieved by a variety of expedients. The inner plastic layer 110a may be preformed under heat and pressure so that it retains the spiral configuration. On the other hand, resilient springs of spiral configuration may be incorporated in the upper extremities 106a in order to insure that the said upper extremities will return to said spiral configuration when the air pressure is cut off.

In utilizing the harvester 10a it is first placed in encompassing relationship with the trunk 26a of the tree 28a by the simple expedient of locating the slot 24a in the bed 14a in registry with said trunk and opening the pivotal section 64a of the first portion 32a of the apron 30a to permit the trunk to be encompassed by the flexible diaphragm 68a.

Prior to this time, the first and second portions 32a and 34a of the catching apron 30a have been lowered to an appropriate angle which will dispose said portions in underlying relationship with the branches of the tree. By adjusting the angle of the portions 32a and 34a of the catching apron 30a it is possible to determine both the return of flow of fruit to the conveyor belt 122a and to adjust the width of the apron 30a and the height of the elongated tubular picking devices 100a. In picking certain types of trees having a vertical habit of growth the portions 32a and 34a of the catching apron 30a may be oriented substantially vertically so that the picking devices 100a operate on horizontal axes.

After the harvester 10a has been located in the previously disclosed manner, the source 90a of the pressure fluid is energized causing pressure air to flow intermittently through the control valve, not shown, to the flexible conduits 86a and thence to the ducts 84a and the associated channels 82a. At once, a cushion of air is created by the vents or outlet openings 96a which do not have a picking device 100a associated therewith. Simultaneously, pressure air causes the extension of the spiral upper extremities 106a of the elongated tubular members 102a and 104a constituting the picking devices 100a. The extension of the spirally formed upper extremities 106a of the elongated tubular members 102a and 104a will cause the upper extremities of said members to unroll and whip to pick such fruit as is desired.

The extension and retraction of the spiral upper extremities 106a will be controlled by the operator of the harvester 10a by adjusting the cycling rate of the flow control valve and by adjusting the air pressure of the pressure air fed through the elongated tubular members 102a and 104a.

The thickness of the tubular walls of the elongated tubular members 102a and 104a will be calculated in accordance with the type of fruit to be picked and, for instance, freestone peaches will be picked by the use of the tubular members 102a and 104a whose upper extremities incorporate soft outer layers 108a than those utilized for picking cling peaches or apples.

Moreover, the lengths of the elongated tubular members 102a and 104a will be varied to accommodate smaller or larger types of trees and the sizes of the air outlets or orifices 114a and 116a in the spiral upper extremities of the elongated tubular members 102a and 104a will be calculated to provide the air flow required for the particular fruit being picked.

As the fruit being picked falls upon the upper surface of the layer 76a it is channeled by the ribs 78a to flow uniformly from the upper edges of the first and second portions 32a and 34a of the apron 30a to the lower edges thereof and through the longitudinally extending openings at the opposite sides of the conveyor 120a onto the conveyor belt 122a.

Fruit dropping on the conveyor shield 126a rolls to one side or the other and is immediately dropped upon the conveyor belt 122a. At the outer or discharge extremity of the conveyor 120a the fruit is fed to the grading device 130a whence it may be conveyed to a bin or box for ultimate transportation to the packing plant.

It will be noted that, in addition to the air cushion on the upper surface of the resilient layer 76a, the resilient material on which the layer 76a is fabricated serves to cushion the fall of the fruit and prevent undue blemishing or damaging thereof. Moreover, the perimetrical elongated tubular picking devices 104a provide an air curtain because of the inward orientation of the air vents or orifices 116a therein which serves to guide the fruit inwardly toward the center of the apron 30a.

The provision of the corrugations defined by the ribs 78a in the upper surface of the apron 30a permits said corrugations to accept twigs, buds or any other hard material which might damage the falling fruit, but the ribs 78a are spaced sufficiently close together to support fruit on the apices of the ribs, thus preventing perforation or blemishing of the fruit.

Obviously, the rib spacing will vary with different sized fruits, smaller fruits being received upon more closely spaced ribs. Therefore, it is conceivable that the base plate 74a and the associated resilient layer 76a incorporating the ribs 78a may be removable to permit the use of appropriately configured portions.

My description in specific detail of the selected embodiments of the invention will suggest various changes, substitutions and other departures from my disclosure within the spirit and scope of the appended claims.

I claim:

1. In an apparatus for removing fruit from a tree, the combination of:
    a base structure;
    a plurality of tubular members;
    means to supply fluid under pressure to said tubular members to create high velocity discharge streams at the outer ends of the tubular members, said tubular members being flexible for whipping movement to dislodge the fruit in reaction to the discharge streams;
    a plurality of supports mounted on said base structure and carrying said tubular members respectively, said supports being extensible and retractible to shift said tubular members towards and away from the base structure, said supports being extensible in response to the pressure of the fluid supplied to the tubular members; and
    remotely controlled means to retract said supports in opposition to the fluid pressure.

2. A combination as set forth in claim 1 in which said remotely controlled means includes fluid-pressure-actuated means for retraction of said supports and further includes means to supply fluid under pressure to said fluid-pressure-actuated means.

3. In an apparatus for removing fruit from a tree, the combination of:
    a base structure;
    a first plurality of tubular members having inner ends and outer ends with outlets in the outer ends;
    a second corresponding plurality of tubular members having inner ends supported by said base structure and having outer ends connected to the first tubular members respectively for support thereof; and
    means to supply fluid under pressure to said first plurality of tubular members through said second plurality of tubular members to create high velocity discharge streams at said outlets, said first plurality of tubular members being highly flexible for whipping action to dislodge the fruit in reaction to the discharge streams, said second plurality of tubular members being less flexible to sway in reaction to forces acting on the first plurality of tubular members whereby the second plurality of tubular members increase the range of whipping action of the first plurality of tubular members.

4. A combination as set forth in claim 3 in which said first plurality of tubular members are rotatable relative to said base structure to rotate in reaction to said discharge streams.

5. In an apparatus for removing fruit from a tree, the combination of:
   a base structure;
   a plurality of tubes having inner ends and outer ends with outlets in the outer ends;
   a corresponding plurality of tubular supports extending from the base structure with their outer ends connected to the inner ends of said tubes respectively for support thereof, each of said tubular supports having relatively movable telescoping parts for extension and retraction of the tubular support, said telescoping parts forming at least one annular chamber;
   means to supply fluid under pressure to said tubes through said tubular supports to create high velocity discharge streams at said outlets of the tubes, said tubes being flexible for whipping movement to dislodge the fruit in reaction to the discharge streams, said tubular supports being extensible in response to the pressure of the fluid supplied therethrough to said tubes; and
   remotely controlled means to supply fluid under pressure to said annular chambers to retract said tubular supports in opposition to the pressure of the fluid that is supplied to said tubes.

6. A combination as set forth in claim 5 in which said remotely controlled means supplies hydraulic fluid to said chambers and which includes valve means to lock the hydraulic fluid in the chambers thereby to lock the tubular supports hydraulically at different degrees of extension.

7. In an apparatus for removing fruit from a tree, the combination of:
   a base structure;
   a first plurality of spaced tubular members fixedly mounted on said base structure and extending therefrom;
   a second plurality of tubular members telescopically mounted on said fixed tubular members for axial extension and retraction relative thereto;
   a third plurality of spaced tubular members telescopically mounted on said second plurality of tubular members respectively for axial extension and retraction relative thereto;
   a corresponding plurality of tubes mounted on the outer ends of said third tubular members and extending therefrom, said tubes having outlets in their outer ends;
   means to supply fluid under pressure to said plurality of tubes through said first, second and third tubular members to create high velocity discharge streams at said outlets, said tubes being flexible for whipping movement to dislodge the fruit in reaction to the discharge streams;
   said second tubular members being extensible relative to the first tubular members in response to the fluid supplied therethrough to said tubes and said third tubular members being extensible relative to said second tubular members in response to the pressure of the fluid supplied therethrough to the tubes;
   a first plurality of annular chambers having inner and outer circumferential walls formed by said first and second tubular members respectively;
   a second plurality of annular chambers having inner and outer circumferential walls formed by said second and third tubular members, respectively; and
   means to supply fluid under pressure to said first and second annular chambers to retract said second and third tubular members in opposition to the pressure of the fluid that is supplied through the tubular members to said tubes.

8. A combination as set forth in claim 7 in which said third tubular members are less flexible than said tubes but are sufficiently flexible to sway in reaction to movement of the tubes thereby to increase the range of whipping action of the tubes.

9. A combination as set forth in claim 7 in which said means to supply fluid under pressure to said first and second chambers is adapted to supply fluid to the second chambers in advance of the first chambers to cause retraction of said second tubular members relative to the first tubular members in advance of retraction of the third tubular members relative to the second tubular members.

10. In an apparatus for removing fruit from a tree, the combination of:
    a base structure;
    an array of spaced tubes mounted on said base structure and extending therefrom for positioning among the branches of a tree, said tubes having outlets at their outer ends; and
    means to supply fluid under pressure to said tubes to create high velocity discharge streams at said outlets, said tubes being flexible for whipping movement to dislodge the fruit in reaction to the discharge streams, said tubes being rotatable relative to said base structure to rotate in reaction to the whipping action of the tubes.

11. A combination as set forth in claim 10 in which said tubes are offset relative to their axes of rotation for rotation in reaction to the fluid streams discharged therefrom.

12. In an apparatus for removing fruit from a tree, the combination of:
    a manifold structure;
    an array of spaced tubes mounted on said manifold structure in fluid communication therewith and extending therefrom for positioning among the branches of a tree, said tubes having outlets at their outer ends;
    means to supply fluid under pressure to said tubes to create high velocity discharge streams at said outlets, said tubes being flexible for whipping movement to dislodge the fruit in reaction to the discharge streams; and
    means restricting the fluid flow into at least some of said tubes for equalizing the distribution of the fluid to the tubes.

13. In an apparatus for removing fruit from a tree, the combination of:
    a vehicle;
    an extensible and retractible support structure on said vehicle;
    an array of spaced tubes mounted on said support structure and extending therefrom for positioning by the support structure among the branches of a tree; and
    means carried by said vehicle to supply fluid under pressure to said tubes to create high velocity discharge streams at the outer ends of the tubes, said tubes being flexible for whipping movement to dislodge the fruit in reaction to the discharge streams.

14. A combination as set forth in claim 13 in which said support structure is extensible to positions over the tree and said array extends downward from the support structure to enter the tree from above.

15. An apparatus for picking fruit from a tree, comprising:
    an apron for positioning under the tree to extend over substantially the horizontal area of the tree to catch the fruit;
    an array of spaced tubes distributed over a substantially smaller area for positioning among the branches of the tree;
    means to supply fluid to said tubes under pressure to create high velocity discharge streams at the outer ends of the tubes, said tubes being flexible for whipping movement to dislodge the fruit in reaction to the discharge streams; and means to support said array of tubes and to shift the array of tubes over the horizontal area of the apron.

16. A combination as set forth in claim 15 in which said support means includes a track united with the apron and carriage means supporting the array and movable along the track.

17. An apparatus for removing fruit from a tree characterized by an array of flexible tubular whips for positioning among the branches of the tree to strike the fruit and thereby release the fruit from the tree in combination with means to force streams of fluid through the whips to the free ends thereof to cause whipping action of the whips in reaction to the energy of the streams.

18. In an apparatus for removing fruit from a fruit tree, the combination of:

an array of spaced tubes for positioning among the branches of the tree, said tubes having outlets at their outer ends; and means to supply gaseous fluid under pressure to said tubes to create high velocity discharge streams at said outlets, said tubes being flexible for whipping movement to dislodge the fruit in reaction to the discharge streams.

References Cited by the Examiner
UNITED STATES PATENTS

| | | | |
|---|---|---|---|
| 5,156 | 6/1847 | Collyer | 56—329 |
| 1,445,596 | 2/1923 | Johnson | 56—329 |
| 1,484,888 | 2/1924 | Johnson | 239—204 |
| 1,811,328 | 6/1931 | Pavloff | 56—329 |
| 2,386,881 | 10/1945 | Phillips | 56—329 X |
| 2,752,195 | 6/1956 | Whitehead | 239—229 X |
| 2,925,687 | 2/1960 | Pronio et al. | 56—328 X |
| 2,945,600 | 7/1960 | Thumim | 302—31 X |
| 2,996,868 | 8/1961 | Voelker | 56—328 |
| 3,063,645 | 11/1962 | Tropeano et al. | 239—204 X |

ABRAHAM G. STONE, *Primary Examiner.*

CARL W. ROBINSON, T. GRAHAM CRAVER,
*Examiners.*